United States Patent Office 2,878,834
Patented Mar. 24, 1959

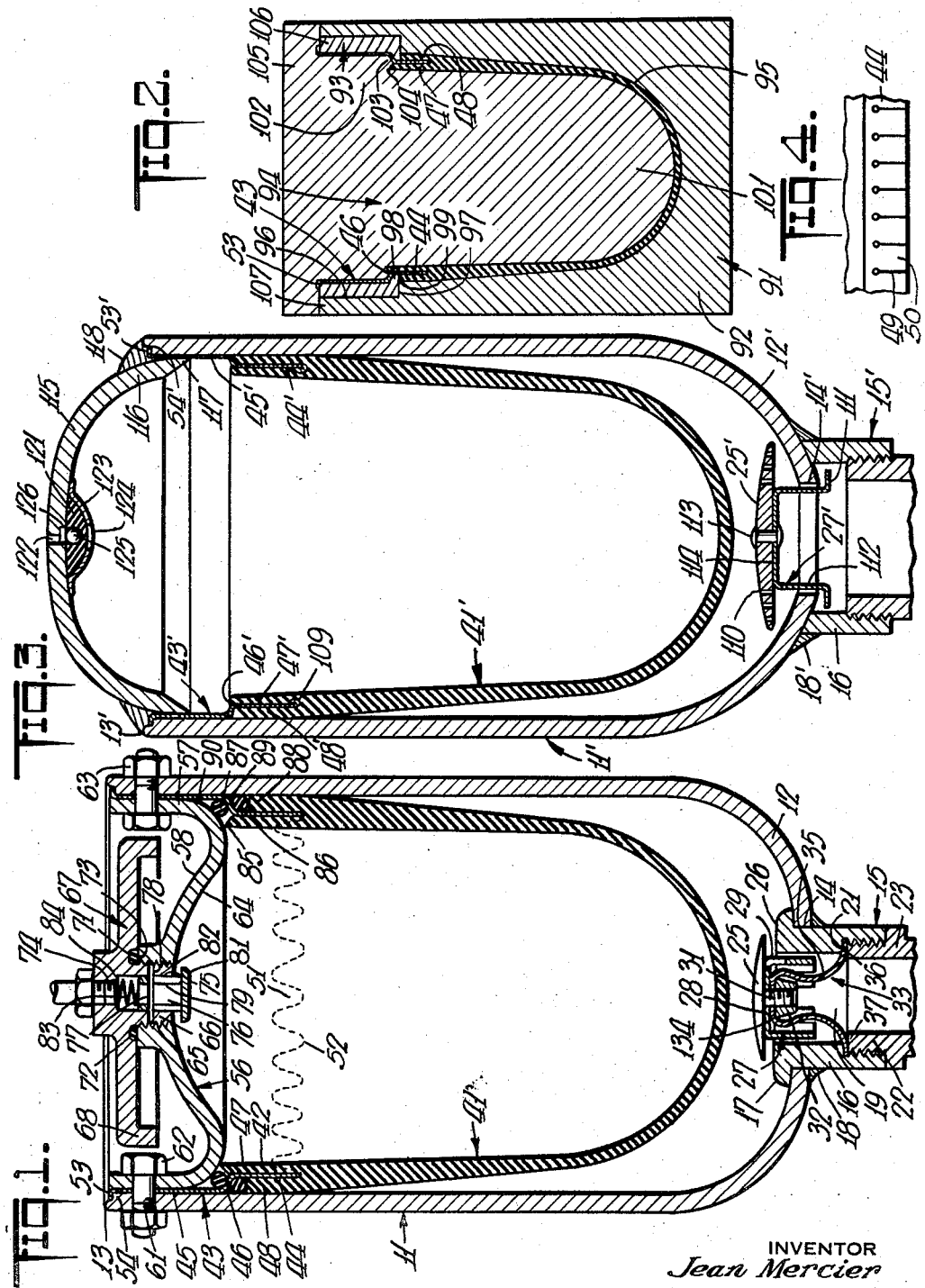

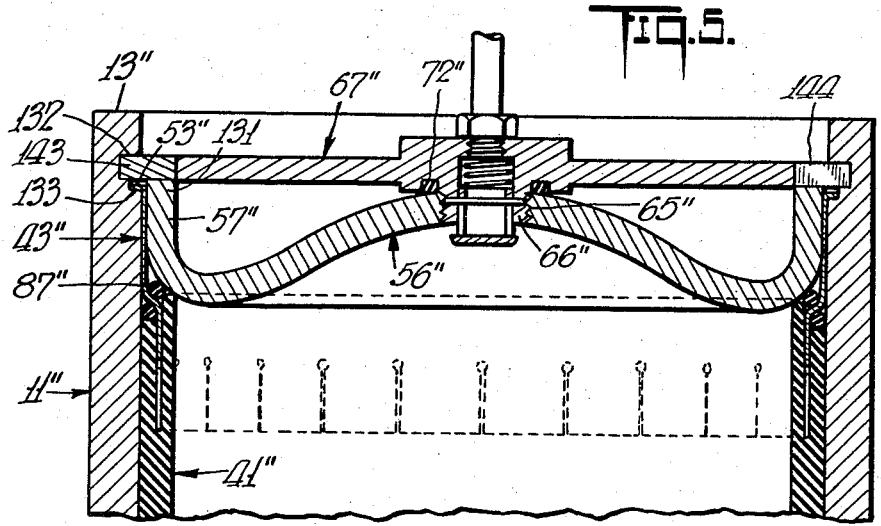
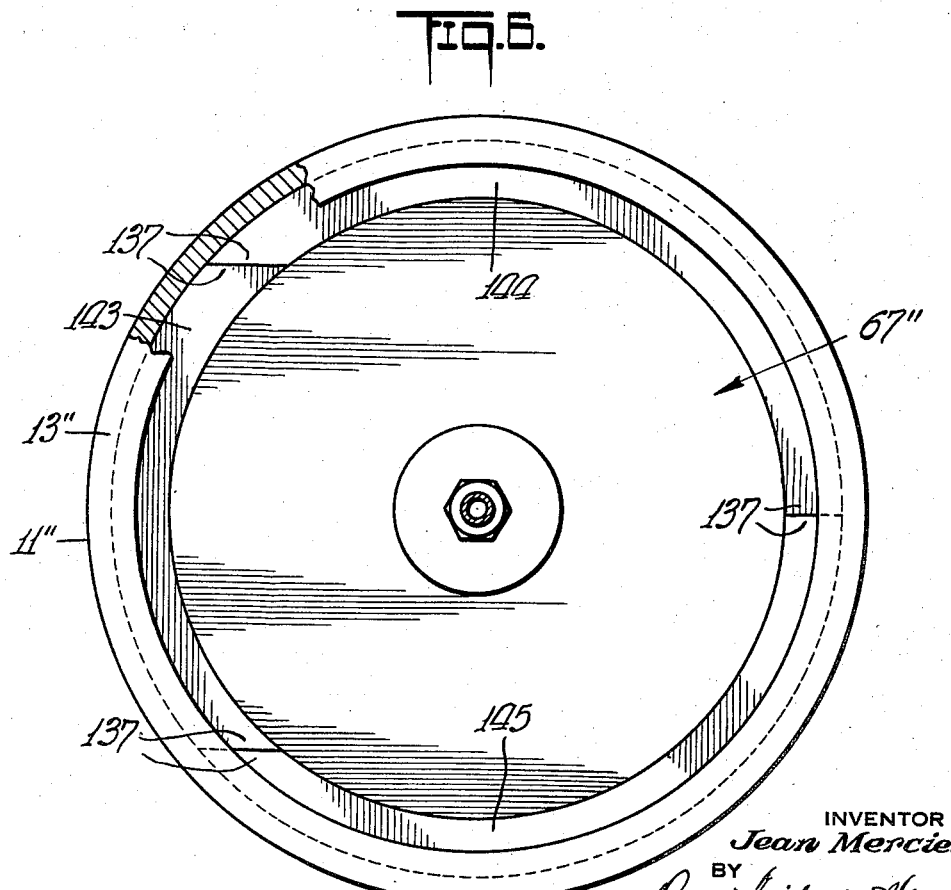

2,878,834

PRESSURE VESSELS

Jean Mercier, New York, N.Y.

Application February 11, 1955, Serial No. 487,610

22 Claims. (Cl. 138—30)

This invention relates to the art of pressure vessels, more particularly of the type known as pressure accumulators.

It is among the objects of the invention to provide a pressure vessel that may readily be fabricated at relatively low cost and which has a cover to provide access to the interior of the vessel and that can be locked when in closed position and cannot be unlocked without automatically causing reduction of the pressure therein to substantially atmospheric pressure, thereby to prevent injury to a mechanic opening the vessel due to blowing out of the cover thereof during disassembly.

Another object is to provide a pressure accumulator which may readily be disassembled for maintenance and for replacement of the deformable bladder container therein, yet which is substantially devoid of leakage of the gas and liquid under pressure therein.

Another object is to provide a pressure vessel of the type having a deformable partition between the gas and liquid ports thereof and which will preclude extrusion of said partition through said gas port.

Another object is to provide a pressure vessel of the type having a deformable partition therein between the gas and liquid ports thereof, which has but few parts that may readily be fabricated at relatively low cost and which may readily be permanently assembled and when once assembled is substantially devoid of leakage of the gas and liquid under pressure therein.

Another object is to provide a deformable bladder for use in pressure vessels of the above type which may readily be fabricated and which is not likely to break down even with long use.

According to the invention, these objects are accomplished by the arrangement and combination of elements hereinafter described and particularly recited in the claims.

In the accompanying drawings in which are shown one or more of various possible embodiments of the several features of the invention, Fig. 1 is a longitudinal sectional view of one embodiment of the invention, Fig. 2 is a longitudinal sectional view of a mold for forming the bladder of Fig. 1, Fig. 3 is a view similar to Fig. 1 of another embodiment, Fig. 4 is a fragmentary detail view of a modification of the bladder supporting member.

Fig. 5 is a view similar to Fig. 1 of still another embodiment, and

Fig. 6 is a plan view of the embodiment of Fig. 5 with parts broken away.

Referring now to Fig. 1 of the drawings, the pressure accumulator comprises a container or pressure vessel 11 of strong rigid material such as steel capable of withstanding high pressures, said container being substantially spherical at one end as at 12 and open at its other end as at 13.

The end 12 of the container has an axial opening 14 in which is mounted a closure assembly 15 defining a port through which a fluid under pressure, such as oil, may flow into and out of the container.

The closure assembly 15 illustratively comprises a tubular member or sleeve 16 of diameter such that it may readily fit in opening 14 and having an external lateral flange 17 at its inner end of diameter greater than that of opening 14 so that it may seat on the periphery of the latter. Although the closure member may be retained in position in opening 14 in any suitable manner, it desirably is welded in place as at 18.

The bore 19 of tubular member 16 is of enlarged internal diameter at its outer end, defining an annular shoulder 21 and such enlarged diameter portion of the bore 19 is internally threaded to receive the correspondingly threaded end 22 of a coupling 23 to which a hydraulic line may be connected.

Positioned in the container is a valve head 25 of diameter greater than that of bore 19 and designed to seat against the inner end 26 of tubular member 16 to cut off flow of fluid from the container. Means are provided to guide the valve head 25 so that it will move axially with respect to tubular member 16. Such means desirably comprises a guide member 27 which may be substantially cup-shaped as shown and of outer diameter just slightly less than that of bore 19 so that it may readily slide therethrough but with substantially no transverse play. The side wall of guide member 27 near its end wall 28 has a plurality of openings 29 through which fluid may flow when the valve head 25 is in open position.

Although the valve head 25 may be affixed to the guide member 27 in any suitable manner, in the embodiment shown, the valve head 25 has a stem 31 which extends through end wall 28 and which has a nut 32 screwed thereon.

Resilient means are provided normally to retain the valve head 25 in open position. Such means desirably comprises a substantially U-shaped leaf spring 33 having an opening in its cross piece 34 through which valve stem 31 also extends so that the valve head 25, end wall 28 and cross piece 34 will be securely clamped together by nut 32. The legs 35 of spring 33 are curved outwardly and the free ends 36 of said legs are positioned between shoulder 21 and the inner end 37 of coupling 23. The openings 29 in the side wall of the guide member are positioned so that they are not transversely aligned with the legs 35 of the leaf spring 33. Thus the streams of fluid flowing through openings 29 will not strike directly against the legs 35 of the leaf spring which might cause premature closing of the valve head 25.

Positioned in the container 11 is a deformable partition 41 illustratively a collapsible and expansible bladder which desirably is of resilient material such as rubber or synthetic plastic of like physical characteristics.

The bladder has a thickened rim 42 to which an annular supporting member 43 is affixed, preferably by being bonded thereto or molded therein as illustratively shown. The supporting member 43 is of resilient sheet material such as metal or suitable plastic and has a lower portion 44 and upper portion 45 lying in substantially parallel planes and connected by a substantially horizontal portion 46 which defines an annular shoulder on each side.

The lower portion 44 of the supporting member 43 is molded into the thickened rim 42 of the bladder 41 in such manner that the inner surface of portion 44 has a layer 47 of resilient material thereon which extends slightly past the connecting portion 46 and the outer surface of portion 44 has a layer 48 of resilient material thereon which terminates below the connecting portion 46.

To impart additional flexibility to the lower portion 44 of annular member 43, it desirably is serrated as at 51 to form a plurality of fingers rounded at their free ends 52. It is to be understood that such flexibility could be imparted in other ways such as by having slits 49 (Fig. 4) in the lower portion 44 extending upwardly from the lower edge 50 thereof.

The outer diameter of the upper portion 45 of mounting member 43 is slightly less than the inner diameter of the container 11 so that it will readily fit therein and said upper portion 45 has an outwardly extending lateral flange 53 at its upper edge which may seat on an annular shoulder 54 at the open end 13 of the container. The outer diameter of the lower portion 44 of the annular member 43 is such that when the annular member 43 and the bladder affixed thereto are positioned in the container, the layer 48 of resilient material will be compressed between the lower portion 44 and the opposed wall of the container.

Means are provided to close the open end 13 of the container 11 and to retain the bladder 41 and annular member 43 in position. To this end, a substantially cup-shaped cover plate 56 is provided, the outer diameter of the side wall 57 of which is slightly less than the inner diameter of the upper portion 45 of supporting member 43, said cover plate 56 being positioned in container 11 in such manner that the side wall 57 rises from the floor 58 thereof.

The cover plate 56 is desirably retained in position by a plurality of bolts 61 which extend respectively through aligned openings in side wall 57, the upper portion 45 of supporting member 43 and the container 11. The heads 62 of the bolts are positioned on the inner surface of side wall 57 and the ends of said bolts protrude beyond the container 11 and have a nut 63 screwed thereon.

Thus, the supporting member 43 will be securely clamped between side wall 57 and container 11 and the bladder 41 will be retained in position in said container.

The cover plate 56 which is desirably concave on its inner surface as at 64, has an axial threaded opening 65 to receive a correspondingly threaded axial boss 66 depending from a retaining disc 67. The disc 67 has a depending flange 68 at its periphery and is of diameter such that the flange 68 will be closely adjacent the heads 62 of bolts 61 to prevent removal of such bolts until the disc is removed.

To provide a dependable seal to prevent leakage past the coacting threads of opening 65 and boss 66, the disc 67 has an annular groove 71 in its undersurface in which a resilient seal 72 such as an O ring is positioned which will be compressed against the outer surface 73 of the cover plate 56 around opening 65.

Extending through disc 67 and axial boss 66 is an axial bore 74 which forms the gas inlet port and which is of enlarged diameter at its inner end as at 75. Slidably mounted in bore portion 75 is a sleeve 76, the movement of which is restricted by means of a pin 77 extending through transversely aligned openings 78 in boss 66 and through elongated slots 79 in sleeve 76. The inner end of sleeve 76 mounts a valve head 81 which is normally spaced from its seat defined by the inner end 82 of boss 66 by means of a coil spring 83 compressed between the sleeve and the adjacent end 84 of bore 75.

With the construction above described, the bladder 41 will be dependably retained in the container 11. However, due to the pressure on the fluids in the bladder and the container when they are charged with gas and liquid under pressure, leakage may occur.

To prevent such leakage, a pair of resilient seals such as O rings 86 and 87 are provided. The O ring 86 is positioned in the space between the end 88 of the layer 48 of resilient material and the undersurface of the shoulder formed by connecting portion 46 and the O ring 87 is positioned in the space between the end 85 of the layer 47 of resilient material and the top surface of said shoulder to provide dependable sealing action in the manner hereinafter to be described.

The accumulator shown in Fig. 1 is charged with gas under pressure through the port 74 which is closed by a suitable valve of any conventional type such as a "Schrader" valve. A fluid such as oil under pressure is forced through the liquid port defined by the closure member 15 into the container 11 to compress the inflated bladder 41.

Consequently, the O rings 86 and 87 will be subjected to the pressure on the gas and oil respectively. As these O rings will be subjected to a high pressure on one side and atmospheric pressure on the other, they will wedge respectively into the spaces 89, 90 between the container wall and the supporting member 43 and between the cover plate 56 and the supporting member 43, thereby providing dependable seals, independent of each other, to preclude leakage of oil and gas from the accumulator. Furthermore, as the bladder is anchored at a location remote from the sealing means, there is no likelihood that leakage at the region of anchorage will affect the sealing action.

If, when the accumulator is charged with oil under pressure, the wall of the bladder should be moved toward the gas inlet port 74, it would first abut against the valve head 81 moving the latter against its seat 82 to prevent extrusion of such bladder with possible injury thereto. By reason of the spring 83 which normally urges the valve head to open position and the slots 79 in the sleeve 76, a passage is normally provided through which the gas under pressure may be forced to initially charge the bladder.

To use the charged accumulator, a valve (not shown) controlling the liquid port, is opened. As a result, oil under pressure will flow past the valve head 25 through openings 29 to the hydraulic unit to be operated by the accumulator. By reason of the tensed leaf spring 33, the valve head will remain off its seat 26 and not until after the expanding bladder abuts against the valve head 25 will the latter seat to prevent extrusion of said bladder.

By reason of the finger 52 or the slits 49 (Fig. 4) of the supporting member 43, the latter will bend readily at its lower portion. Thus, regardless of the number of times the bladder is expanded and compressed, there will be no sharp bending of the bladder at the lower edge of the supporting member which might cause rupture of the bladder.

As the bolts 61 cannot be removed until the disc 67 is unscrewed to move its flange 68 out of alignment with the bolt heads 62 and as even partial unscrewing of the disc 67 will break the seal provided by the O ring 72 so that the pressure on the gas in the bladder 41 can be relieved past the coacting threads in opening 65 and on boss 66, there is no danger that a mechanic may remove the cover plate 56 with any substantial air pressure remaining in the bladder. Consequently, there is no danger of injury as a result of the cover plate being blown out of the container during disassembly.

The bladder shown in Fig. 1 may be formed by means of the mold 91 shown in Fig. 2. The mold comprises a base 92, an annular insert 93 and a core 94. The base 92 has a central recess 95 which is substantially conical, conforming to the desired configuration of the bladder.

The recess 95 adjacent its upper portion is of enlarged diameter as at 96 defining an annular shoulder 97 on which the lower end of the insert 93 is to be seated. The insert at its lower end has an inwardly extending flange 98 which extends laterally beyond the inner edge 99 of shoulder 97 and said flange serves as the seat for the connecting portion 46 of supporting member 43.

The core 94 comprises a body portion 101 of configuration complementary to that of the lower portion of the base recess 95 and of enlarged diameter as at 102 above said body portion, defining an annular shoulder 103 adapted to seat against the top surface of connecting portion 46 of the supporting member 43. In addition, the shoulder 103 adjacent its inner periphery has an annular groove 104 which will be positioned inwardly of the supporting member 43 when the mold is closed.

The enlarged diameter portion 102 of the core is of length substantially equal to that of the enlarged diameter portion 96 of the base and a further enlarged diameter portion 105 is provided at the outer end of the core which will seat on the outer end 106 of the insert and the rim 107 of the base.

To form the bladder with the mold shown in Fig. 2, the insert 93 is first placed on shoulder 97 and the supporting member 43 is then positioned in the insert so that the connecting portion 46 of the supporting member 43 seats on flange 98 of the insert and the flange 53 of the supporting member 43 sits on the outer end 106 of the insert.

A predetermined charge of material such as uncured rubber, natural or synthetic is placed in the bottom of the recess 95 in base 92. The core 94 is then placed in the recess 95 and forced downwardly as by means of a hydraulic press. As a result, the uncured rubber will rise to the undersurface of flange 98 and to the top of annular groove 104 to fill the space between the core and the recess wall. As the bottom portion 44 of the supporting member 43 is positioned substantially midway between the core and the wall of the recess, the layers 47 and 48 will be formed on each side thereof.

The bladder in the mold may then be cured in conventional manner to form the finished product.

The embodiment shown in Fig. 3 is especially designed for use as a shock alleviator and will permit large volume flow into the unit and small volume flow out of the unit. The device comprises a container or pressure vessel 11' also of strong, rigid material capable of withstanding high pressures, said container being substantially spherical at one end as at 12' and open at its other end as at 13'.

The end 12' of the container has an axial opening 14' defining a liquid port and a closure assembly 15' is associated therewith. The closure assembly comprises a tubular member or sleeve 16' of diameter greater than that of port 14' and affixed with respect thereto as by welding at 18' to the exterior of the container.

Positioned in the container is a valve head 25' of diameter greater than that of opening 14' and having a plurality of small apertures 110 therethrough, said valve head 25' being designed to seat against the inner surface of the container substantially to cut off flow from said container.

Means are provided to guide the valve head 25' so that it will move axially with respect to the container. Such means comprises a guide member 27', illustratively a strip of rigid metal substantially U-shaped as shown and having an outwardly extending lateral flange 111 at the end of each of its guide legs 112.

Although the valve head 25' may be affixed to the guide member 27' in any suitable manner, as illustratively shown, a rivet 113 extends through the valve head 25' and the cross piece 114 of the guide member securely to clamp these elements together.

The distance between the legs 112 is substantially equal to the diameter of opening 14' so that the valve head will be guided with substantially no transverse play and the flanges 111 extending outwardly past the periphery of opening 14' limit the inward movement of the valve head 25 and impart a slight damping action to such inward movement, as liquid is forced into the container.

The bladder 41' and associated supporting member 43' are substantially identical to the corresponding elements of the embodiment of Fig. 1 and have the same reference numerals primed. The bladder 41' differs from the bladder 41 substantially only in that the layer 48' extends up to the undersurface of connecting portion 46' and said layer 47' is thinner at its lower extremity than the layer 48'. In addition, the lower edge of the lower portion 44' of supporting member 43' is reversely bent as at 109. It is to be understood that the lower portion 44' could be serrated as shown in Fig. 1 or slit as shown in Fig. 4.

The open end 13' of the container 11' also desirably has an annular shoulder 54' on its inner periphery on which is seated the lateral flange 53' of the retaining member 43'. The container is closed by means of a substantially cup-shaped cap 115, the outer diameter of the side wall 116 of which is slightly less than the inner diameter of the upper portion 45' of supporting member 43' so that it will wedge snugly therein and the rim 117 of said cap 115 is designed to be spaced from the connecting portion 46' of supporting member 43'.

The cap 115, the container 11' and the supporting member 43' are securely retained together as by welding at 118 to prevent leakage from the container and the bladder.

The assembled unit of Fig. 3 may be charged with gas under pressure through an axial port 122 in the cap 115. As shown, a mass of self-sealing material 121 such as rubber is affixed to the inner surface of the cap 115, so as to be aligned with port 122, as by means of a retaining plate 123, the latter having an opening 124 aligned with said port.

To prevent extrusion of said self-sealing material 121 from port 122, a ball 125 of rigid material such as steel is molded in said mass 121 and is positioned against a seat 126 formed by an enlargement of port 122. Thus, when a hollow needle (not shown) is inserted into port 122, it will deflect the ball 125 to the side as it passes through opening 124 into the bladder and gas under pressure may then be forced into the bladder.

When the needle is withdrawn, due to the pressure in the bladder 41' the ball 125 will again be forced against its seat 126 to prevent extrusion of the rubber mass 121.

When liquid under pressure is forced through the tubular member 16', the valve 25' will be moved inwardly away from the periphery of opening 14'. As a result, a large volume of liquid may enter the container. Due to the flanges 111, which act as baffles, the inward movement of the valve head will be slightly restrained.

As layer 47' is thinner at its lower end than layer 48', when the bladder is compressed it will readily bend over the reversely bent edge 109 without making a sharp fold which might cause rupture of such bladder with repeated use.

When a valve (not shown) controlling the closure member 15' is opened, due to the large passageway afforded by opening 14' for flow of fluid, the pressure in the tubular member 16' will be less than that in the container 11' with a result that the valve head 25' will seat almost immediately. Thereafter, the only flow from the container will be that through the relatively small openings 110 in valve head 25'.

In addition, as the pressure on the gas in the bladder would be greater than that on the liquid in the container, the pressure on the inner surface of the upper portion 45' of retaining member 43' would force such portion 45' against the wall of the container for enhanced anchorage action which would eliminate some of the strain at the region at which the lower portion 44' of the retaining member is affixed to the bladder.

The embodiment shown in Fig. 5 is similar in many respects to the embodiment shown in Fig. 1 and corresponding parts have the same reference numerals double primed.

In this embodiment, the open end 13" of container 11" is closed by a cup-shaped cover plate 56" similar to cover plate 56 of Fig. 1. The side wall 57" of cover plate 56" is of length such that when it is positioned in the container with its lower portion resting against seal ring 87", the rim 131 of the cover plate will be substantially aligned with an internal annular groove 132 near end 13".

The deformable partition 41" and associated supporting member 43" in container 11" is substantially identical to the corresponding elements shown in Fig. 1. As shown in Fig. 5, the flange 53" of supporting member 43" is positioned on an annular shoulder 133 formed at the inner periphery of annular groove 132.

Thus, when a plurality of arcuate locking segments 134, 135 and 136 are positioned in annular groove 132, the inner periphery of such segments which forms an annulus and which extends laterally beyond groove 132, will retain the cover plate 56" in closed position and the side wall 57" of the cover plate will retain flange 53" on shoulder 133 to anchor the partition in the container 11".

The arcuate segments desirably have their adjacent ends 137 parallel to a line extending diametrically across the annulus so that they may readily be inserted into said annular groove 132.

The retaining disc 67" shown in Fig. 5 is of diameter just slightly less than the inner periphery of the annulus defined by the locking segments. Thus when the axial boss 66" of disc 67" is scrwed tightly into threaded opening 65", the periphery of disc 67" will be aligned with the locking segments to prevent removal of the latter.

As a result, it is not until the disc 67" is rotated to move the periphery thereof out of alignment with said locking segments that the cover plate 56" be removed. As even partial unscrewing of disc 67" will break the seal provided by O ring 72" for relief of the pressure in bladder 41" past the coacting threads of opening 65" and boss 66", there is no danger of injury to a mechanic as a result of the cover plate being blown out of the container during disassembly.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A device of the character described comprising a container having an opening, a cover for said opening, said opening and said cover having juxtaposed wall portions, a deformable bladder in said container, said bladder having a mouth, a supporting member affixed to the mouth of said bladder and having a portion extending outwardly therefrom and positioned between the juxtaposed wall portions of said opening and said cover, means securely retaining together said wall portions and the outwardly extending portion of said supporting member, said cover and said container each having a port, said bladder being interposed between said ports and valve means controlling each of said ports.

2. The combination set forth in claim 1 in which said supporting member is an annulus, the lower portion of which is affixed to the mouth of the bladder and the upper portion of which is positioned between said juxtaposed wall portions.

3. The combination set forth in claim 1 in which said supporting member is an annulus having a lower portion and an upper portion lying in substantially parallel planes and a substantially horizontal portion connecting said two portions, the lower portion of said annulus being affixed to the mouth of said bladder and having a layer of said bladder material on each side thereof and the upper portion of said supporting member is positioned between said juxtaposed wall portions.

4. The combination set forth in claim 3 in which the lower edge of said lower portion is reversely bent.

5. A device of the character described comprising a container having an opening, a cover in said opening, said openings and said cover having juxtaposed wall portions, a deformable bladder in said container, said bladder having a mouth, a supporting member comprising an annulus having a lower portion and an upper portion lying in substantially parallel planes and a substantially horizontal portion connecting said two portions, the lower portion of said annulus being affixed to the mouth of said bladder and having a layer of bladder material on each side thereof, the layer of material on the outer surface of the lower portion of the supporting member being of greater thickness at its lower end than the layer of material on the inner surface thereof, the upper portion of said supporting member extending outwardly from the mouth of said bladder and being positioned between the juxtaposed wall portions of said opening and said cover, means securely retaining together said wall portions and the outwardly extending portion of said supporting member, said cover and said container each having a port, said bladder being interposed between said ports and valve means controlling each of said ports.

6. A device of the character described comprising a container having an opening, a cover in said opening, said openings and said cover having juxtaposed wall portions, a deformable bladder in said container, said bladder having a mouth, a supporting member comprising an annulus having a lower portion and an upper portion lying in substantially parallel planes and a substantially horizontal portion connecting said two portions, the lower portion of said annulus being affixed to the mouth of said bladder and having a layer of bladder material on each side thereof, the layer of bladder material on the outer surface of said lower portion terminating at a position spaced from said connecting portion, an annular seal positioned in the space between the end of said outer layer and the undersurface of said connecting portion, a second annular seal positioned in the space between the top surface of said connecting portion and the adjacent surface of said cover, the upper portion of said supporting member extending outwardly from the mouth of said bladder and being positioned between the juxtaposed wall portions of said opening and said cover, means securely retaining together said wall portions and the outwardly extending portion of said supporting member, said cover and said container each having a port, said bladder being interposed between said ports and valve means controlling each of said ports.

7. A device of the character described comprising a container having an opening, a cover in said opening, said openings and said cover having juxtaposed wall portions, a deformable bladder in said container, said bladder having a mouth, a supporting member comprising an annulus having a lower portion and an upper portion lying in substantially parallel planes and a substantially horizontal portion connecting said two portions, the lower portion of said annulus being affixed to the mouth of said bladder and having a layer of bladder material on each side thereof, the upper portion of said supporting member extending outwardly from the mouth of said bladder and being positioned between the juxtaposed wall portions of said opening and said cover, the lower end of said lower portion being serrated to form a plurality of fingers, means securely retaining together said wall portions and the outwardly extending portion of said supporting member, said cover and said container each having a port, said bladder being interposed between said ports and valve means controlling each of said ports.

8. A device of the character described comprising a container having an opening, a cover in said opening, said openings and said cover having juxtaposed wall portions, a deformable bladder in said container, said bladder having a mouth, a supporting member comprising an annulus having a lower portion and an upper portion lying in substantially parallel planes and a substantially horizontal portion connecting said two portions, the lower portion of said annulus being affixed to the mouth of said bladder and having a layer of bladder material on each side thereof, the upper portion of said supporting member extending outwardly from the mouth of said bladder and being positioned between the juxtaposed wall portions of said opening and said cover, the lower portion of said supporting member having a plurality of slits extending from the lower edge thereof, means securely retaining together said wall portions and the outwardly extending portion of said supporting member, said cover and said container each having a port, said bladder being interposed between said ports and valve means controlling each of said ports.

9. A pressure vessel comprising a container having an opening, a cover in said opening, said opening and said cover having juxtaposed wall portions, means coacting with said wall portions releasably to lock said cover in said opening, means mounted on said cover and movable into and out of juxtaposition with said locking means to retain said locking means in position when in juxtaposition therewith, and means controlled by the actuation of said movable means to relieve the pressure in said container prior to movement of said movable means out of juxtaposition with said locking means.

10. A pressure vessel comprising a cylindrical container open at one end, a substantially cup-shaped cover positioned in the open end of said container, the side wall of said cover extending outwardly from the end wall thereof, a plurality of bolts extending through the side wall of the cover and the wall of the container, the head of said bolts being positioned in said cup-shaped cover, said cover having a central opening leading into said container, a disc having an axial hub screwed into said opening, the periphery of said disc being in juxtaposition to said bolt heads to prevent removal of said bolts and means to provide a seal to prevent escape of gas under pressure from said container through the opening in said cover when said hub is screwed into said opening.

11. The combination set forth in claim 10 in which said disc has an annular groove in its undersurface encompassing said hub and said sealing means comprises a resilient sealing ring in said groove compressed against the top surface of said cover around the opening therethrough when the hub is screwed tightly into said opening.

12. A pressure vessel comprising a cylindrical container open at one end, a deformable bladder in said container, said bladder having a mouth, an annular supporting member for said bladder, said supporting member having a lower portion and an upper portion lying in substantially parallel planes and a substantially horizontal portion connecting said two portions, the lower portion of said supporting member being affixed to the mouth of said bladder, the upper portion of said supporting member being of diameter substantially equal to the inner diameter of said container to fit readily therein and having an outwardly extending flange at its free end resting on the rim of the open end of said container thereby supporting said bladder in said container, a cup-shaped cover having a side wall of diameter substantially equal to that of the upper portion of the supporting member and means securely to connect the rim of said container, said flange and said cover together, said cover and said container each having a port, said bladder being interposed between said ports.

13. The combination set forth in claim 12 in which the rim of said cover is spaced from said connecting portion.

14. The combination set forth in claim 12 in which there is a layer of bladder material on each of the surfaces of said lower portion of said supporting member and the rim of said cover is spaced from said connecting portion.

15. A pressure vessel comprising a cylindrical container open at one end, a deformable bladder in said container, said bladder having a mouth, an annular supporting member for said bladder, said supporting member having a lower portion and an upper portion lying in substantially parallel planes and a substantially horizontal portion connecting said two portions, the lower portion of said supporting member being affixed to the mouth of said bladder, the upper portion of said supporting member being of diameter substantially equal to the inner diameter of said container to fit readily therein and having an outwardly extending flange at its free end, said container having an internal annular groove near its open end, said flange resting on the periphery of said groove, thereby supporting said bladder in said container, a cup-shaped cover having a side wall of diameter substantially equal to that of the upper portion of the supporting member, removable means positioned in said annular groove securely to retain said cover in said container, said cover having a central opening leading into said container, a disc having an axial hub screwed into said opening, the periphery of said disc being in juxtaposition to said removable means to prevent removal thereof and means to provide a seal to prevent escape of gas under pressure from said container through the opening in said cover when said hub is screwed into said opening.

16. As an article of manufacture, a bladder of resilient material having a mouth and an annular supporting member affixed at its lower portion in the wall of the bladder at its mouth and extending outwardly therefrom.

17. The combination set forth in claim 16 in which said lower portion of said supporting member is molded integrally with said bladder and a layer of resilient material is positioned on each surface of said lower portion.

18. The combination set forth in claim 16 in which the lower edge of said lower portion is reversely bent.

19. As an article of manufacture, a bladder of resilient material having a mouth and an annular supporting member affixed at its lower portion in the wall of the bladder at its mouth and extending outwardly therefrom, the lower edge of said lower portion being serrated to form a plurality of fingers.

20. As an article of manufacture, a bladder of resilient material having a mouth and an annular supporting member affixed at its lower portion in the wall of the bladder at its mouth and extending outwardly therefrom, the lower portion of said supporting member having a plurality of slits extending from the lower edge thereof.

21. As an article of manufacture, a bladder of resilient material having a mouth and an annular supporting member having a lower portion molded integrally with the bladder at its mouth and an upper portion extending outwardly therefrom, a layer of resilient material being positioned on each surface of said lower portion, the layer of material on the outer surface of said lower portion being of greater thickness at its lower end than the layer of material on the inner surface of said lower portion.

22. As an article of manufacture, a bladder of resilient material having a mouth, an annular supporting member of sheet material having a lower portion affixed in the wall of the bladder at its mouth and an upper portion extending outwardly therefrom, said upper portion being in a plane substantially parallel to the plane of said lower portion and a substantially horizontal portion connecting the lower and upper portions of said supporting member.

(References on following page)

References Cited in the file of this patent
UNITED STATES PATENTS

| | | |
|---|---|---|
| 1,173,755 | Straight | Feb. 29, 1916 |
| 1,361,946 | Whitaker | Dec. 16, 1920 |
| 1,706,051 | Auchincloss | Mar. 19, 1929 |
| 1,972,264 | Hirschhorn | Sept. 4, 1934 |
| 2,063,355 | Wheway | Dec. 8, 1936 |
| 2,321,340 | Waterbury | June 8, 1943 |
| 2,345,124 | Huber | Mar. 28, 1944 |
| 2,401,791 | Overbeke | June 11, 1946 |
| 2,480,558 | De Kiss | Aug. 30, 1949 |
| 2,721,580 | Greer | Oct. 25, 1955 |
| 2,731,038 | Purcell | Jan. 17, 1956 |
| 2,773,511 | Mercier | Dec. 11, 1956 |